United States Patent [19]
Ubaldi et al.

[11] Patent Number: 5,762,006
[45] Date of Patent: *Jun. 9, 1998

[54] COMPOUND CURVATURE, DOMICAL STRUCTURE FOR WASTE-TO-ENERGY FACILITIES

[75] Inventors: Richard Ubaldi, Wayne, N.J.; Paul L. Hauck, Tampa, Fla.; Kevin J. Walls, Blairstown, N.J.

[73] Assignee: Ogden Projects, Inc., Fairfield, N.J.

[ * ] Notice: The term of this patent shall not extend beyond the expiration date of Pat. No. 5,531,170.

[21] Appl. No.: 319,591

[22] Filed: Oct. 7, 1994

Related U.S. Application Data

[63] Continuation-in-part of Ser. No. 155,842, Nov. 23, 1993.
[51] Int. Cl.$^6$ ...................................... B09B 3/00
[52] U.S. Cl. .................. 110/235; 110/234; 110/203; 110/349; 60/39.12; 60/39.464; 60/39.5
[58] Field of Search ................. 110/346, 349, 110/212, 234; 52/80.1, 81.1, 218, 219; 60/39.12, 39.464, 39.5

[56] References Cited

U.S. PATENT DOCUMENTS

| | | | |
|---|---|---|---|
| 3,318,780 | 5/1967 | Bohmann et al. | 52/81.1 |
| 3,365,855 | 1/1968 | Vermette | 52/80.1 |
| 4,193,354 | 3/1980 | Woods | 110/212 |
| 4,578,912 | 4/1986 | Ericsson | 52/302.3 |
| 5,069,147 | 12/1991 | Tan et al. | 110/349 |
| 5,222,446 | 6/1993 | Edwards et al. | 110/346 |
| 5,347,938 | 9/1994 | Takazawa | 110/346 |
| 5,361,550 | 11/1994 | Kaden | 52/80.1 |
| 5,370,067 | 12/1994 | Finet | 110/346 |

Primary Examiner—Henry A. Bennett
Assistant Examiner—Susanne C. Tinker
Attorney, Agent, or Firm—Dickstein Shapiro Morin & Oshinsky LLP

[57] ABSTRACT

The present invention relates to a domical structure capable of enclosing the majority of operational and integrating many of the structural elements of a waste-to-energy, waste processing or other combustion facility. The domical structure according to the present invention improves the aesthetic appearance of the facility by enclosing the majority of the machinery, equipment, activities and chimney from outside view. The domical structure also reduces the cost of construction and operation by reducing the support structure and improving lighting and climate control. The domical structure according to the present invention also includes means for easily transferring waste and materials between different areas or processing portions of a waste-to-energy facility and for providing an aerodynamic exterior surface that allows for the integration of an aerodynamic cupola and flue assembly which in total, can reduce wakes and downwash effects while maintaining plume rise and flue gas dispersion characteristics associated with wind patterns found in the wake of tall GEP chimneys and cubicle structures.

23 Claims, 10 Drawing Sheets

COMPOUND CURVATURE, DOMICAL STRUCTURE FOR WASTE-TO-ENERGY FACILITIES

This application is a Continuation-In-Part of U.S. patent application Ser. No. 08/155,842 filed on Nov. 23, 1993, the entire disclosure of which is incorporated herein by reference.

FIELD OF THE INVENTION

The present invention relates to a building structure for housing and integrating with waste-to-energy, other waste processing facilities or other facilities that involve a combustion process or discharge emissions through a chimney that generally require detailed air modeling and flue gas dispersion calculations as part of their operating permit requirements. More specifically, it relates to a domical structure capable of enclosing the majority of the operational and integrating many of the structural elements of a waste-to-energy facility, a specific pit arrangement, and an improved integrated aerodynamic cupola and exiting flue gas structure assembly for the same.

BACKGROUND OF THE INVENTION

Americans throw away more trash per person than any other country in the world. Total municipal solid waste requiring disposal each year is still growing and is projected to exceed 200 million tons by the year 2000. Over three-fourths of this waste is currently buried in approximately 6,000 landfills across the country. Increasingly stringent landfill regulations, costs and availability of property, and recent data that suggests the health risk impact of landfills on the environment, has created a situation in which many operating landfills have been forced to shut down permanently, with new landfills delayed or postponed indefinitely.

Waste-to-energy facilities, which convert the waste into usable steam and electrical energy, are an alternative to landfilling. The United States Environmental Protection Agency, in its 1989 Agenda for Action, highlighted the importance of waste-to-energy as a disposal tool available to communities today. Waste is turned into a domestic source of renewable biomass energy, lessening dependence on foreign oil and domestic fossil fuels for energy production and, at the same time, protecting health and the environment from the impacts of landfilling and other forms of waste disposal. However, the siting of waste-to-energy facilities and other waste processing facilities has met increased resistance from local community groups. Similar sitings concerns have been stated for other combustion related facilities. A waste-to-energy facility consists of equipment housed in structures of a variety of sizes and shapes, the majority of which are attached while others are free standing, such as the chimney. Typically, structures are enclosed with metal siding while some equipment remains visible outside the structures. These enclosures and equipment are generally large structures which require extensive support and foundations. This combination of buildings, external equipment and chimneys can lead to facilities that are not aesthetically pleasing or in harmony with the surrounding community. This increases resistance to such facilities and limits the ability to site them. Generally, other types of waste processing and combustion related facilities have similar structures and difficulties, including the requirement for a freestanding or externally attached flue gas discharge chimney.

Construction of these facilities is expensive due to the extensive support structures required for the buildings. These facilities also require significant amounts of energy for lighting and climate control within the various structures which form the facility. In addition, the expense of these facilities can increase when maintenance and operational personnel have to work outdoors in inclement situations.

Therefore, a need exists for a more aesthetically pleasing facility which houses the majority of the fuel processing and combustion equipment, structures and integrates the chimney of the processing or combustion facility under one envelope in such a manner as to not violate the universally accepted rules for predicting plume transport from a freestanding or externally attached tall chimney designed to good engineering practices (GEP). A need also exists for a structural system which reduces foundation and support requirements and their associated costs. A need also exists for a structural system which improves construction, operational and maintenance conditions.

SUMMARY OF THE INVENTION

Therefore, it is an object of the present invention to provide an aesthetically pleasing, lightweight clear span structural envelope for enclosing the majority of the elements of a waste-to-energy or other combustion facility. It is another object of the present invention to reduce the structural and foundation needs by reducing support structures by better balancing of stresses and minimizing wind loads.

It is another object of the present invention to take advantage of the dome's inherent aerodynamics, and when compared to cubical structures, reduce the effect of wake, and downwash effects, while maintaining plume rise and flue gas dispersion characteristics typical of a freestanding and tall chimney designed to good engineering practices which are routinely used to assess the impact of emissions on air quality. These characteristics allow for the integration of the chimney within the domical structure, and once integrated, allow for the elimination of the chimney shell structural support, leaving only the internal flues to penetrate the domical structure at its apex as part of the aerodynamic cupola and flue assembly.

It is another object of the invention to reduce the overall height of the flues beyond the cupola and flue assembly, while still maintaining the same plume rise and flue gas dispersion characteristics of a tall chimney designed to good engineering practices.

It is another object of the present invention to reduce operating costs by providing improved ventilation, climate control, and lighting and to reduce the capital cost of noise containment within a single enclosed structure.

These and other objects of the present invention are achieved by a lightweight clear span domical structure of symmetrical spherical, elliptical or trapezoidal dimensions enclosing the majority of the waste-to-energy or other combustion facility. The clear span structure minimizes the support requirements and construction costs by reducing the number of separate and/or contiguous buildings and, due to its inherent structural properties, providing a lightweight system which better balances forces and loads. Ventilation and climate control is improved through the use of open areas or louvers in the domical structure and by taking advantage of the different temperature zones within the domical structure through the cross-ventilation or natural drafting of the processing facilities. A total or partial translucent dome reduces lighting costs by allowing the passage of sunlight and/or the use of reflective lighting. With these and other objects, aspects and advantages of the present invention as may become hereafter apparent, the nature of the invention may be more clearly understood from the following description, the attached figures and the appended claims herein.

DETAILED DESCRIPTION OF THE PREFERRED EMBODIMENTS

Figure 1:
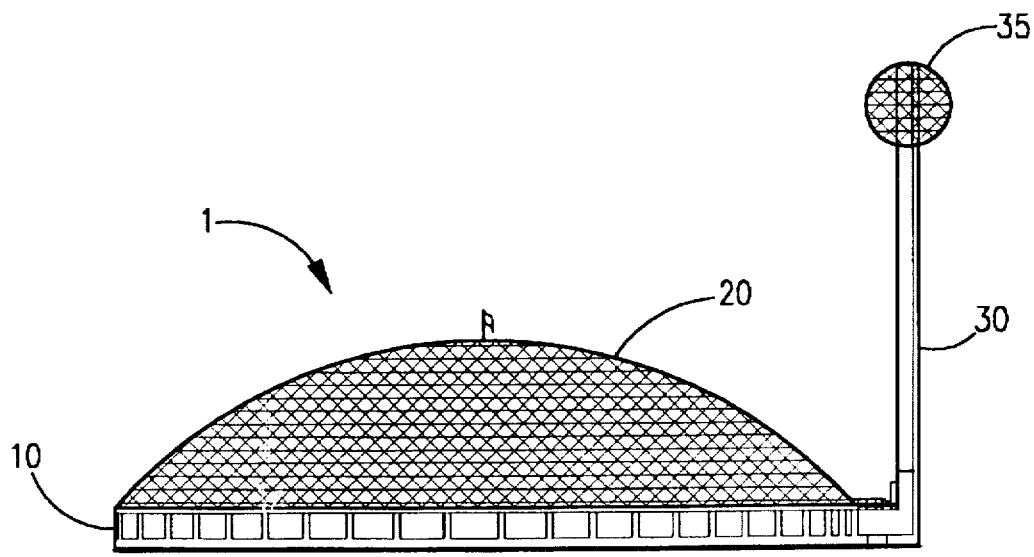
FIG. 1 is a side view of a domical structure for a waste-to-energy facility according to a preferred embodiment of the present invention.

Referring now in detail to the drawings wherein like parts are designated by like reference numerals throughout, there is illustrated in FIG. 1 a domical structure 1 for a waste-to-energy facility, waste transfer facility, recycling facility, or other waste processing facility. Additionally, the type of facility described can include any manufacturing system or power generating facility that involves a combustion process or discharges emissions through a chimney.

The domical structure 1 consists of a perimeter wall 10 which encircles the majority of the components of the waste processing facility. The retaining wall 10 supports a domed roof 20. Although the domed roof 20 is preferably of partial spherical shape, as illustrated, other shapes are contemplated by the present invention. Elliptical, trapezoidal, omni-triangulated, or other compound curvature structures which can accommodate the majority of the facility's processing equipment can be used. Unlike the aerodynamic cupola and flue assembly which will be described later, the chimney 30 is external to the domical structure 1 and can include a similar domical or spherical structure 35 at or near the location of the test ports and Continuous Emissions Monitoring equipment or at the top of the chimney, to house the equipment and maintenance personnel and to enhance the aesthetic nature of the entire facility in this embodiment.

In addition to enhanced aesthetics, the domical structure 1 improves building strength and reduces construction costs. The domical structure 1 balances structural stresses and reduces wind load, wake and downwash effects. This permits less material to be used to construct the domical structure. It also reduces the weight and, thus, the required support and foundation structure. Maintenance is also reduced since repairs of processing equipment can be performed inside the domical structure 1, while the quantity of structural components requiring maintenance and frequency of maintenance is reduced. Finally, construction time and costs are reduced since the domical structure 1 may be erected in the early stages of construction. Construction of the interior waste processing facility is then independent of weather conditions and may proceed around the clock.

Figure 2:
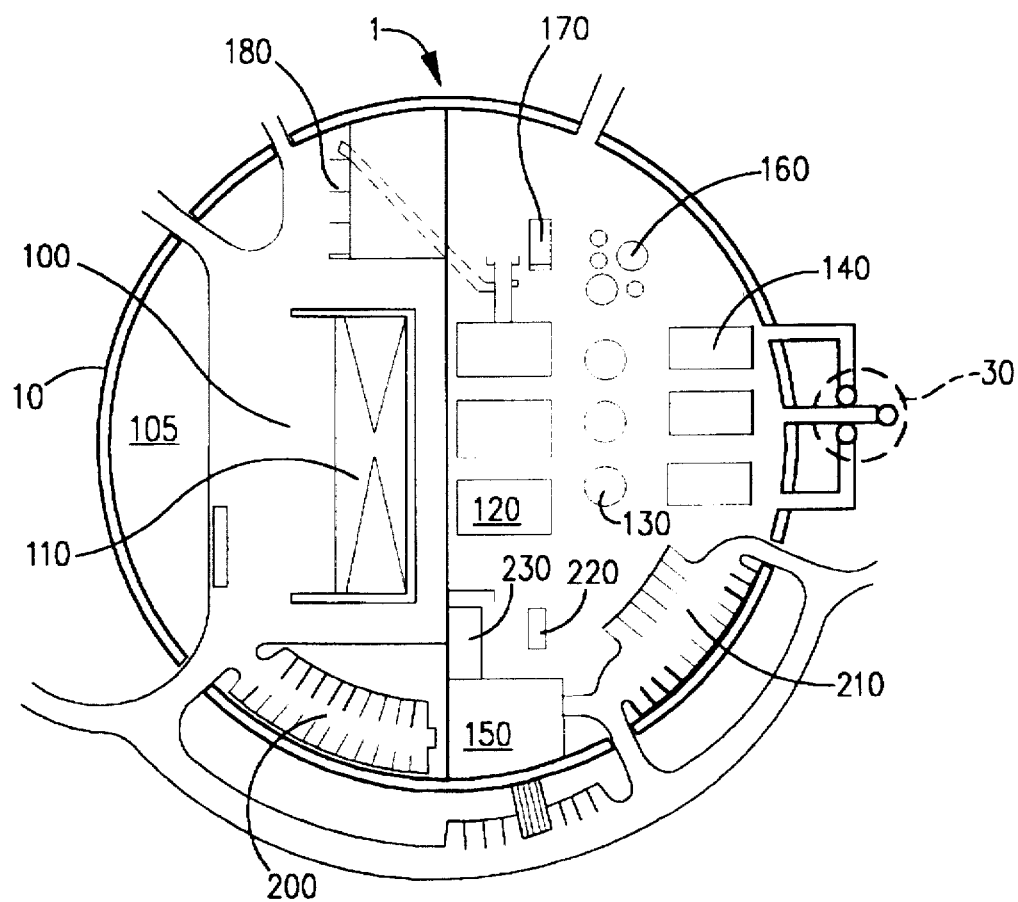
FIG. 2 is a cross-sectional plane view of the components of the waste-to-energy facility according to a preferred embodiment of the present invention.

FIG. 2 illustrates placement of the various components of a waste-to-energy facility within the domical structure 1 according to a preferred embodiment. As illustrated in FIG. 2, the perimeter wall 10 is of circular shape. However, it could be elliptical, trapezoidal or other symmetric or asymmetric shape so as to accommodate the majority of the necessary parts for the waste-to-energy facility. The principal elements of the facility are 100-foot high boilers 120 which are used to burn the refuse and generate steam. Preferably, these are located near the center of the domical structure 1 so as to reduce the necessary height of the structure and to improve interior ventilation and climate control. The tipping area 100 and refuse pit 110 are enclosed within the facility to control odors, contain fugitive noise, fugitive dust and rainwater runoff which can otherwise result. They are located adjacent to the boilers 120 to ease transfer of the waste to the boilers for burning.

The steam produced by the boilers is fed to turbine generators 220 located adjacent to the boilers which produce electricity. In steam only producing facilities, there may be no turbine generators and steam is piped directly to the end user external to the domical structure 1. The control system 230 for monitoring and controlling operation of the entire facility is also located adjacent to the boilers.

Areas designed for air pollution control equipment consisting primarily of, but not limited to, scrubbers 130 and bag house filters 140, waste water treatment 160, ash recycling and storage 180, ash transfer 170, and administration 150 are included under the domical structure 1. Air pollution equipment is used to process the combustion air and the flue gas produced in the boilers. The ash can be shifted to recover various materials for recycling, using known methods. Such methods include ferrous recovery, non-ferrous recovery, and ash aggregate processing. Furthermore, pre-combustion recycling can be performed in the area 105 between the perimeter wall 10 and the pit 110, reducing the waste to be burned and the resulting ash generated. In order to improve the aesthetic nature surrounding the facility, parking areas 200 and 210 can also be included inside the structure. When required for site conditions, most types of cooling towers (not shown) would still need to be placed outside the domical structure 1 for proper operation. External noise levels are reduced by the placement of all major components of the facility under the domical structure 1.

Figure 3:
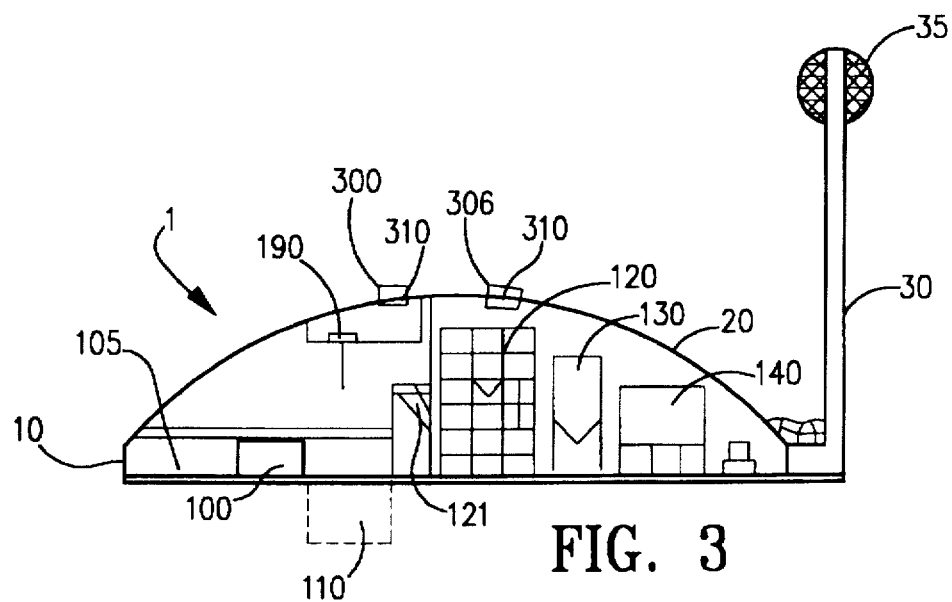
FIG. 3 is a cross-sectional elevational view of the waste-to-energy facility according to a preferred embodiment of the present invention.

The inclusion of the major components of the waste-to-energy facility under a single domical structure 1 eases transfer of material, principally waste and ash, from one area of the facility to another and increases the level of environmental protection. As shown in FIG. 3, a crane 190 may be suspended from the inside surface of the domed structure 20. The crane 190 is used for moving material from the various portions of the structure to other portions, such as waste from the pit 110 through chute 121 to the boilers 120.

Figure 4:
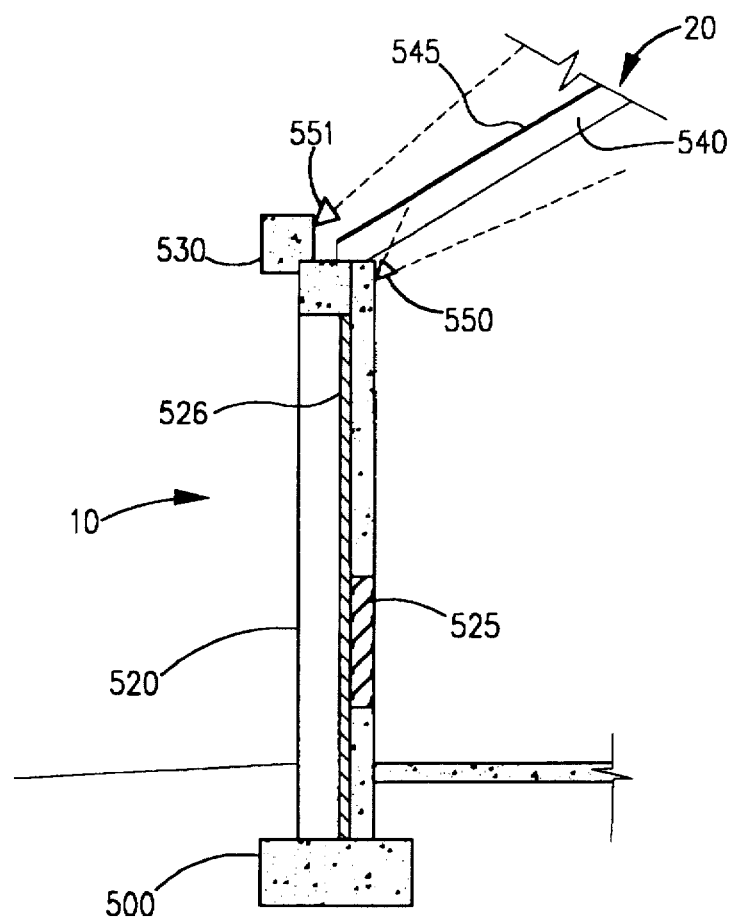
FIG. 4 is a partial cross-sectional view of the waste-to-energy facility showing the design of the wall and roof structure.

FIG. 4 illustrates design of the perimeter wall 10 of the domical structure 1. A foundation 500 supports columns 520 on which the domed structure 20 rests. A tension ring 530 surrounds the perimeter wall 10 at the upper portion where the domed structure 20 is attached. The wall 10 itself consists of siding 526 or louvers 525 between the columns 520. The louvers 525 are used to provide improved ventilation inside the domical structure 1. Openings 310 at the apex of the domed structure 20 in connection with the louvers 525 surrounding the retaining wall induce a natural ventilation of the domical structure 1. Under certain climatic conditions, fans 300 may be utilized to assist in circulation of air. The domed structure 20 is constructed of support members 540 and a dome skin 545 on the exterior of the support members 540. All or a portion of the dome skin 545 can be made of a translucent material which permits sunlight to enter the structure to improve visibility and reduce lighting costs. In addition, lighting of the domical structure 1 can be effectuated through the use of interior lights 550 or exterior lights 551 which are directed towards the domed structure 20. The interior lights 550 provide reflective lighting to the entire facility. In addition, other interior lights (not shown) can be attached to the domed structure 20 at other locations for sufficient lighting of the entire domical structure 1.

Figure 5:
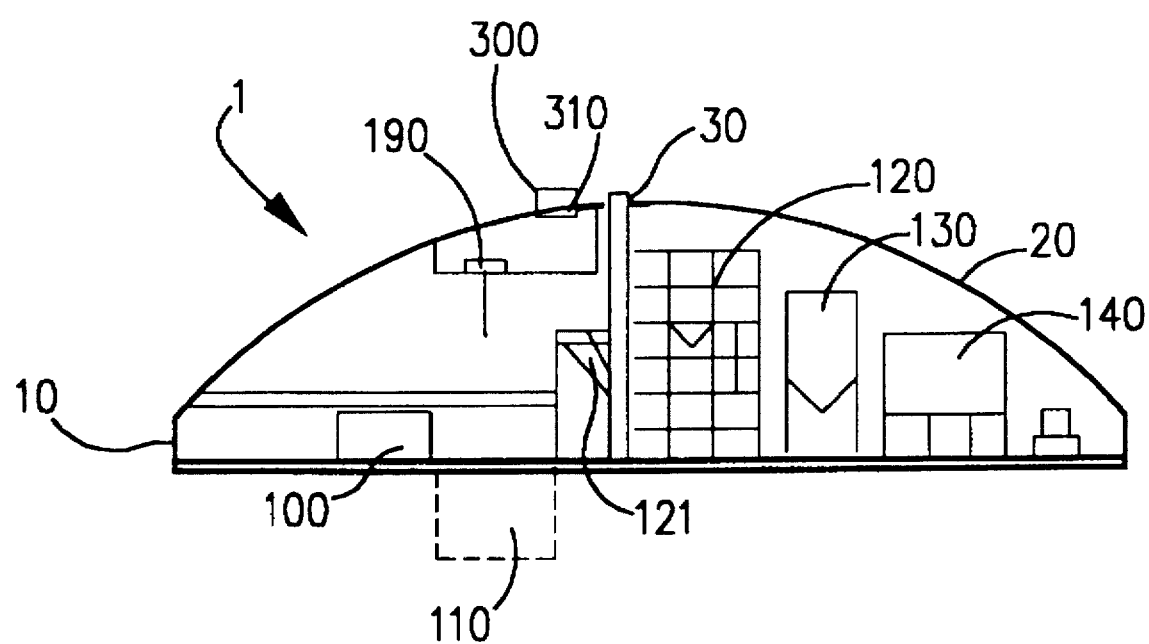
FIG. 5 is a cross-sectional elevational view of the waste-to-energy facility according to a second preferred embodiment of the present invention.

FIG. 5 illustrates a second embodiment of the present invention wherein the flue 30 is located in the domical structure as close as possible to its centroid and penetrating the domical structure at its apex without the need for a supporting chimney structure. The aerodynamic shape of the domical structure 1 creates a wind flow and boundary layer pattern which reduces wake and downwash effects at the flue 30 and maintains plume rise and dispersion characteristics when compared to a freestanding or externally attached GEP chimney. Reducing wake and downwash effects allows the flue to be considerably shortened, which consequently reduces construction and maintenance costs and reduces the visual intrusion of the facility on the surrounding community. The reduced wake and downwash, and maintained plume rise and dispersion effects can be further enhanced by the inclusion of pressure equalization or external flow control means. The pressure equalization means would include natural ventilation characteristics and/or additional openings in the domical structure or superstructures on the surface 1 to direct air flow patterns around and through the facility. Fans 300 and instrumentation (not shown) can be used to improve and better control and monitor airflow for equalizing pressure.

Figure 6:
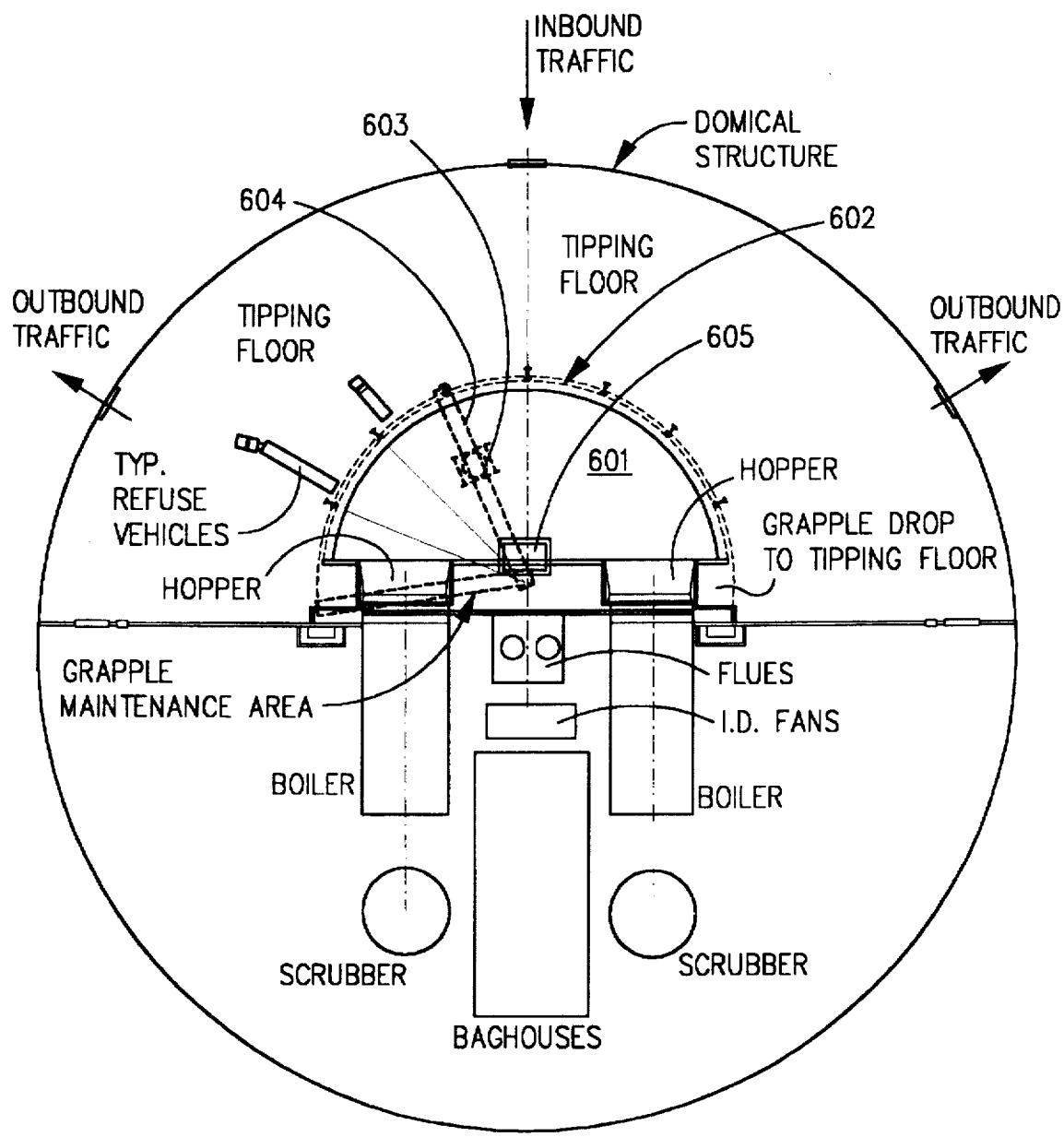
FIG. 6 is a plan view of the waste-to-energy facility according to a third preferred embodiment of the present invention showing a radial pit configuration.

FIG. 6 illustrates a third embodiment of the present invention wherein a pit 601 is formed in a radial configuration. Crane rail 602 is also formed in the same radial shape at the periphery of the pit area 601.

Each radial crane 603 is located on the bridge 604 between the control pulpit 605 and the crane rail 602. The radial type pit 601 and movable radial crane 603 provide the crane with the ability to move any waste located in any place within the radial pit. The radial pit thus offers many operational benefits such as but not limited to, increased vehicle discharge areas along the perimeter and decreased crane tolerance requirements. Further, the radial pit fits the dome more efficiently.

Figure 7:
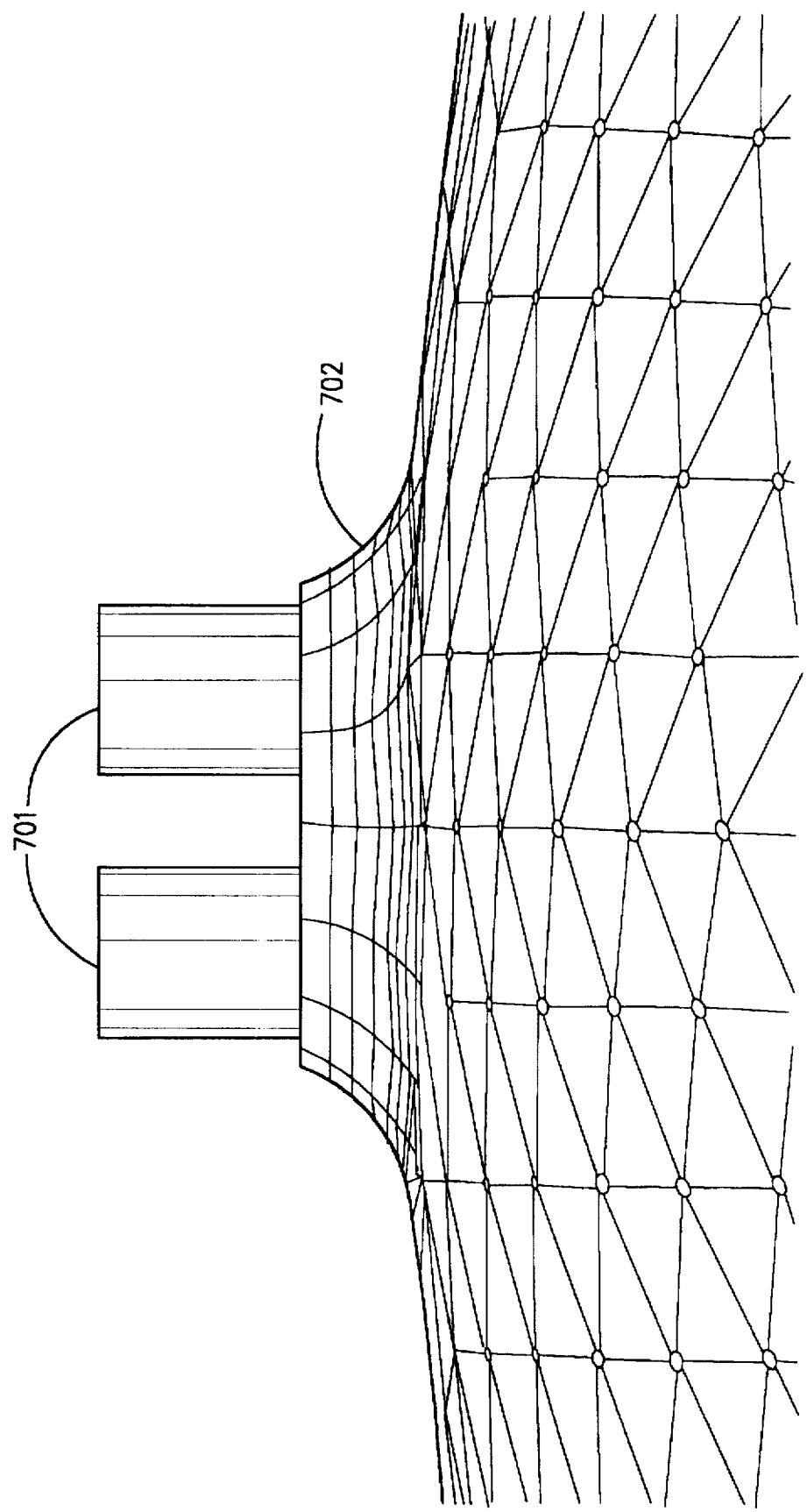
FIG. 7 is a side view of the integrated raised cupola and flue assembly with extended twin flues according to a fourth preferred embodiment of the present invention.

FIG. 7 illustrates a fourth embodiment of the present invention wherein the apex of the dome is formed into an cupola and flue assembly in order to accommodate the twin flues that penetrate the dome. The twin flues 701 are extended above the raised cupola and flue assembly 702. The height of the twin flues 701 will enhance the efficiency of flue gas venting at the flue 701. The length of extended twin flues above the raised cupola and flue assembly is about 10% of the total height of the dome, or in any event no greater than 3 times higher than the height of the cupola and flue assembly itself. The height of the raised cupola and flue assembly is between 1 to 5 feet. As a consequence of the cupola and flue assembly's design and dimensions, a natural drafting of air through the dome is allowed.

Figure 8:
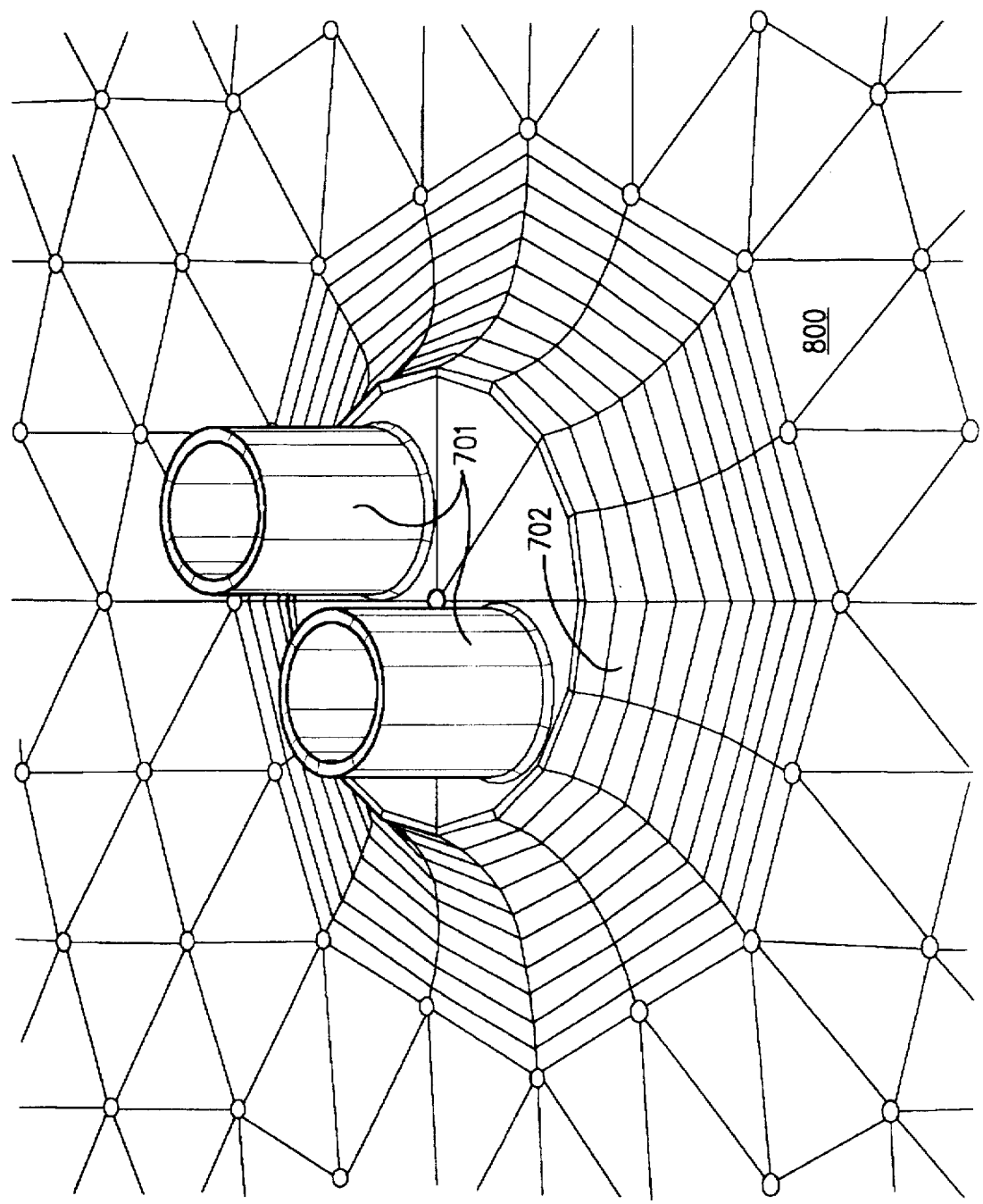
FIG. 8 is a top perspective view of the integrated raised cupola and flue assembly with extended twin flues for the domical structure shown in FIG. 7.

FIG. 8 is a top perspective view of the twin flues 701 and a raised cupola and flue assembly 702 above the outer wall 800 of the domical structure.

Figure 9:
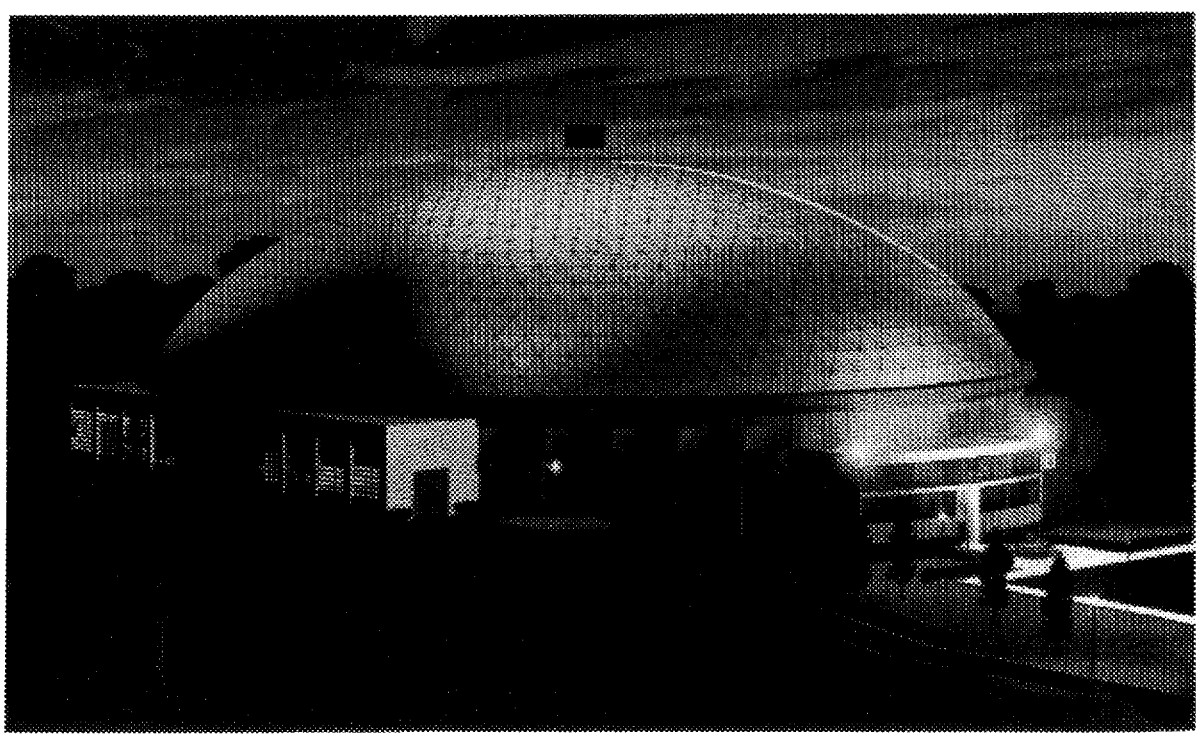
FIG. 9 is a side view of the domical structure for a waste-to-energy facility showing the reduced height of the exiting flues of FIG. 7.

FIG. 9 is a side elevational view of the entire domical structure, cupola and flue assembly.

Figure 10A:
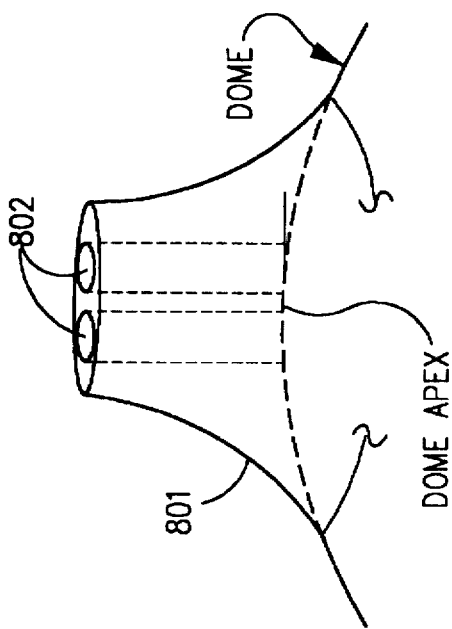
FIG. 10 and 10A are perspective views of the domical structure according to a fifth preferred embodiment which embodies a venting cupola and flue assembly.
Figure 10:
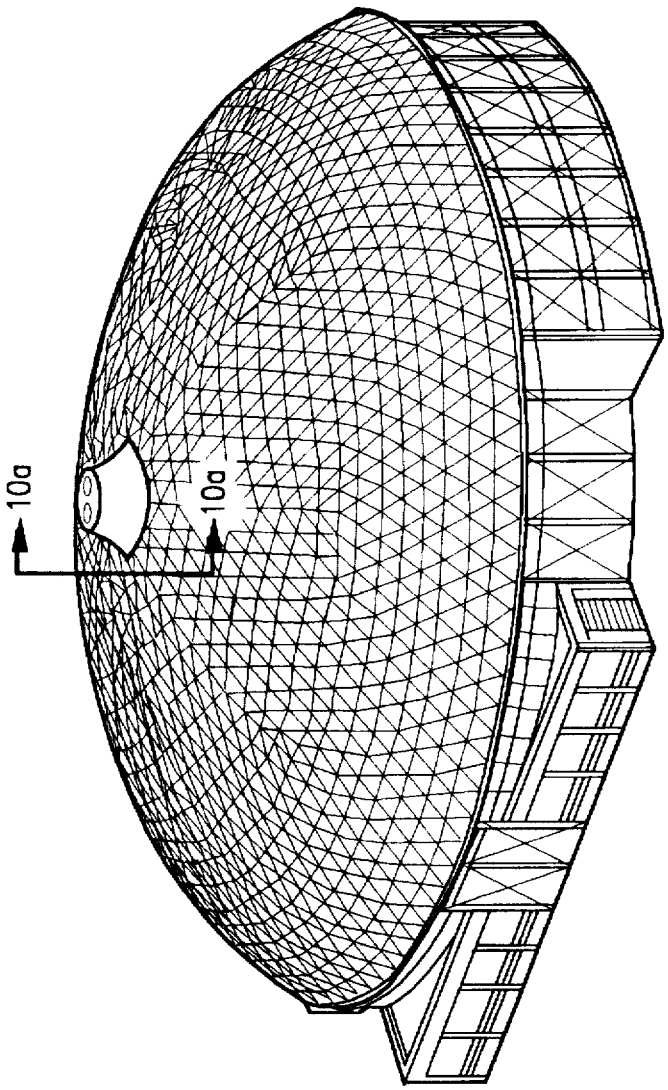

FIG. 10 illustrates a fifth embodiment of the cupola and flue assembly at the apex. The raised cupola and flue assembly at the apex is extended to aerodynamically cover the twin flues 802 to form a venting cupola. The venting cupola 801 conceals the extended flue. The height of the venting cupola is about five feet.

Figure 11:
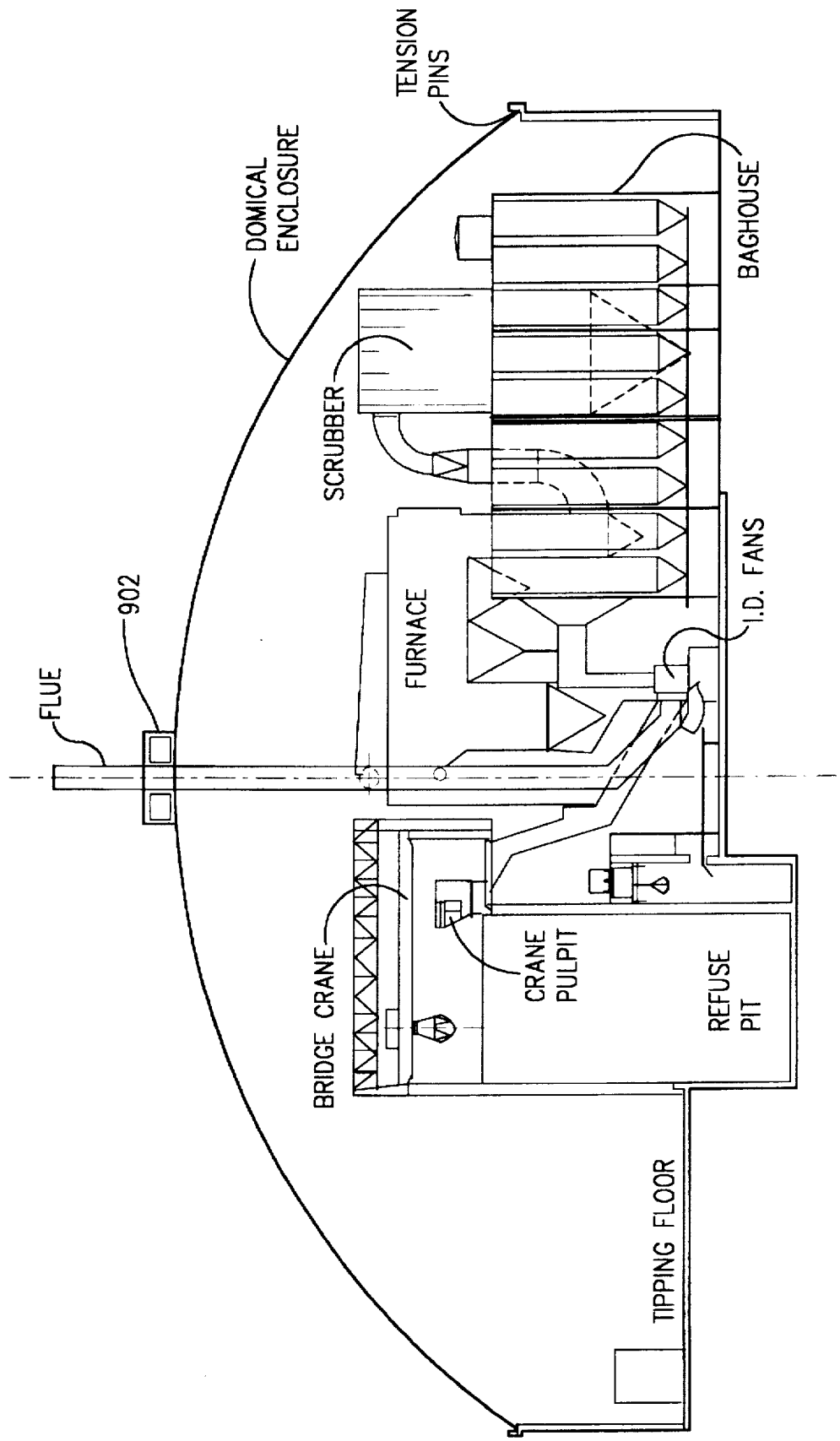
FIG. 11 is a cross sectional elevational view of the waste-to energy facility which embodies heating, ventilation and air conditioning apparatus housed in the cupola and flue assembly, and shows the center flue design.

FIG. 11 illustrates a waste-to-energy facility which embodies a heating, ventilating and air conditioning apparatus 902 contained within the cupola and flue assembly housing. This apparatus is adaptable to any flue structures of the embodiments illustrated above. This apparatus allows control of heating, ventilation and air conditioning both within the domical structure as well as about the flue. The flue is located at the centroid of the domical structure and penetrates the domical structure at its apex.

Figure 12:
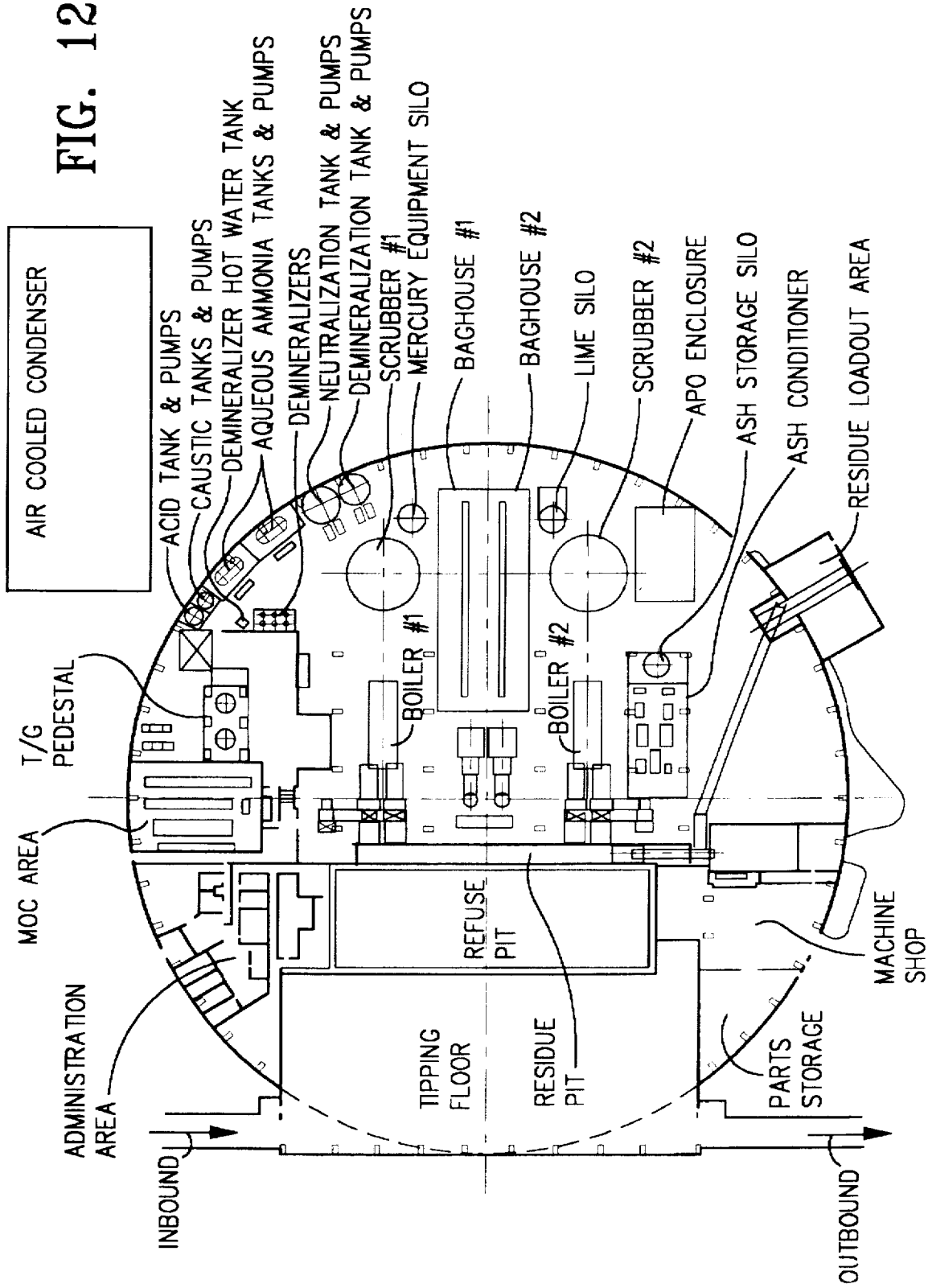
FIG. 12 is a cross sectional plane view of the waste-to-energy facility according to the embodiment of FIG. 11.

FIG. 12 illustrates a waste-to-energy facility according to the embodiment of FIG. 11. This facility utilizes a square "center chimney" layout that minimizes the facility's foot print allowing it to be efficiently integrated within the domical structure while providing centroid location for the flues.

Although a preferred embodiment is specifically illustrated and described herein, it will be appreciated that modifications and variations of the present invention are covered by the above teachings and within the purview of the appended claims without departing from the spirit and intended scope of this invention. For example, the present invention can be employed in any manufacturing, power generator or incinerator setting where an element of the process entails combustion or discharge of emissions through a chimney.

What is claimed is:

1. A facility producing waste gases exhausted from the facility to the atmosphere comprising:

a tipper for depositing waste or other fuel material into the facility;

a refuse or other fuel storage area for storing said deposited waste or other fuel material;

a boiler for converting said waste or other fuel material to energy;

an ash transferor for removing ash from said boiler;

a water treatment system for processing water used in said boiler;

combustion air and flue gas treatment system for processing air used and flue gas produced in said boiler;

a turbine generator for the production of electrical energy; and a building structure for enclosing a substantial portion of the facility, the building structure including:

a domical portion having an apex; and a chimney located proximate said apex and extending outwardly therefrom;

wherein the shape of said domical portion and said chimney allow waste gas to be aerodynamically dispersed thereby reducing downwash.

2. The facility according to claim 1, wherein said domical portion includes:

an ingress for passing said waste or other fuel material to said tipper; and an egress for passing said ash from said ash transferor.

3. The facility according to claim 2, further comprising an ash processing system for recovering materials from said ash, and wherein said egress includes a conveyor system for passing said recovered materials from said ash processing system.

4. The facility according to claim 1, wherein said domical portion includes a crane for transferring said waste material or other fuel material from said refuse or other fuel storage area to said boiler.

5. The facility according to claim 4 wherein said crane includes a movable radial crane for lifting and passing said waste or other fuel material or said recovered material located in any place within the facility.

6. The facility according to claim 1, wherein said domical portion includes:

a perimeter wall substantially surrounding the facility; and a roof connected to and supported by a tension ring in said perimeter wall of substantially domical shape.

7. The facility according to claim 1, wherein said domical portion includes illumination for illuminating the facility.

8. The facility according to claim 1, wherein said domical portion is constructed of a translucent material for passing light from outside said domical portion.

9. The facility according to claim 1, wherein the structure includes a ventilation system which ventilates the structure, said ventilation system including openings in said domical portion.

10. The facility according to claim 9, wherein said ventilation system includes natural ventilation.

11. The facility according to claim 9, wherein said openings are located proximate a floor of the structure and proximate said apex.

12. The facility according to claim 9, wherein said ventilation system further comprises:

a pair of flues extending from said domical portion proximate said apex;

a raised cupola and flue assembly forming a base around said flues; and wherein said flues extend above said raised cupola and flue assembly.

13. The facility according to claim 9, wherein said ventilation system further comprises:

a pair of flues extending from said domical portion proximate said apex;

a raised cupola and flue assembly extending from said domical portion proximate said apex;

wherein said assembly conceals said flues and allows ambient air to flow aerodynamically over said domical portion without interfering with or affecting the dispersion of said waste gas.

14. The facility according to claim 12, wherein said flues extend above said raised cupola and flue assembly to a length between 5 and 15 percent of the height of said domical portion.

15. The facility according to claim 12, wherein said flues extend above said assembly to a length between 1 and 3 times greater than the height of said assembly.

16. The facility according to claim 13, the height of said raised cupola and flue assembly is between 5 and 15 percent of the height of said domical portion.

17. The facility according to claim 13, wherein the height of said raised cupola and flue assembly is between 1 and 5 feet.

18. The facility according to claim 1, wherein said chimney is integrated at approximately the center of said domical portion.

19. The facility according to claim 1, further comprising a pressure equalization system which reduces wake and downwash effects and maintains dispersion from said chimney.

20. The facility of claim 1 wherein the facility is one of a waste processing facility, a manufacturing system, and a power generating facility.

21. The facility of claim 1 wherein said domical portion is one of a partial spherical shape, an elliptical shape, a trapezoidal shape, an omni-triangulated shape or another compound curvature shape.

22. The facility of claim 1 wherein said chimney extends downwardly from said domical portion connecting to the facility.

23. The facility of claim 1 wherein said waste gases flow through said chimney.

* * * * *